Nov. 9, 1971   P. PARTZSCH   3,618,382
FLIGHT MEASURING INSTRUMENT
Filed June 19, 1970   3 Sheets-Sheet 1

INVENTOR
PETER PARTZSCH

BY *James E. Bryan*

ATTORNEY

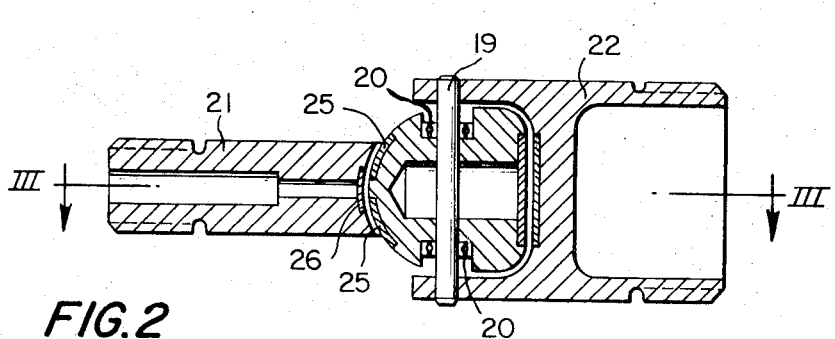
FIG.2
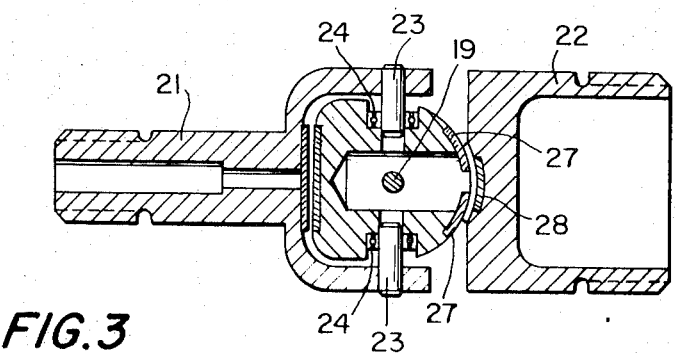
FIG.3
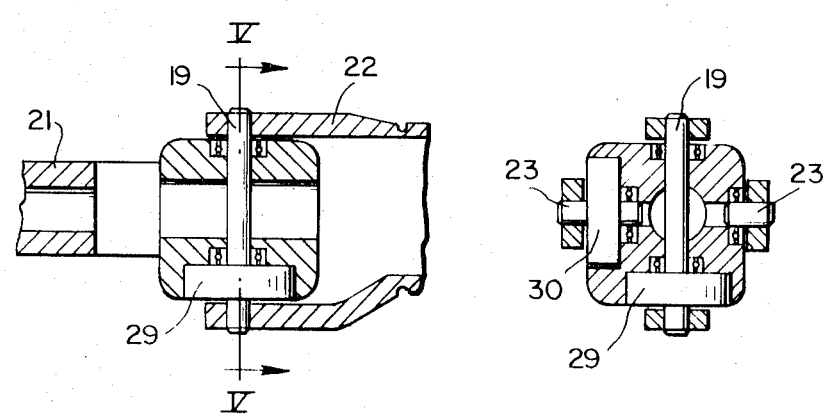
FIG.4
FIG.5

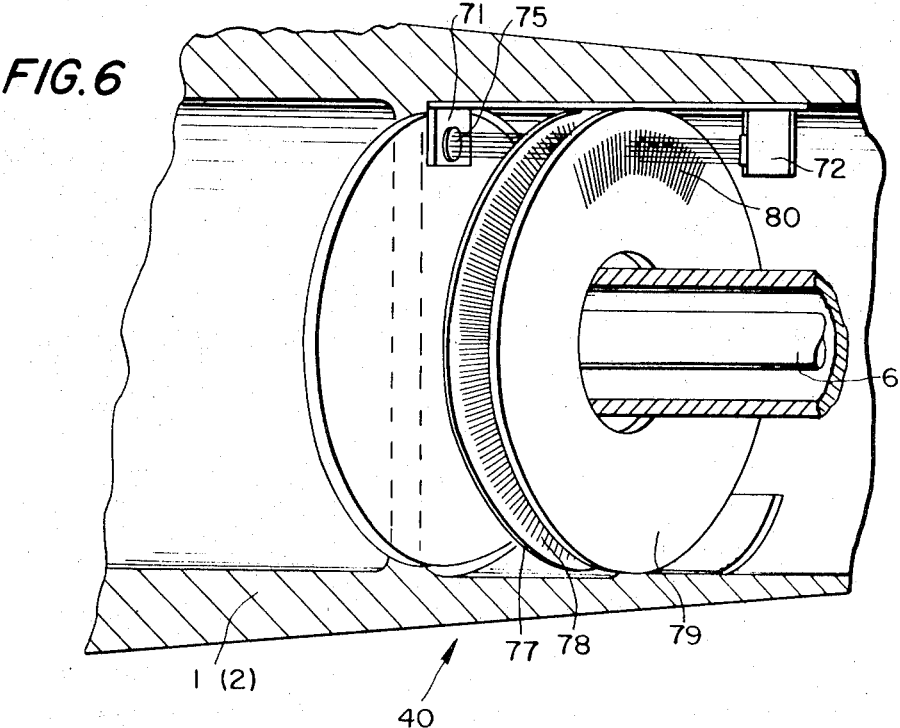
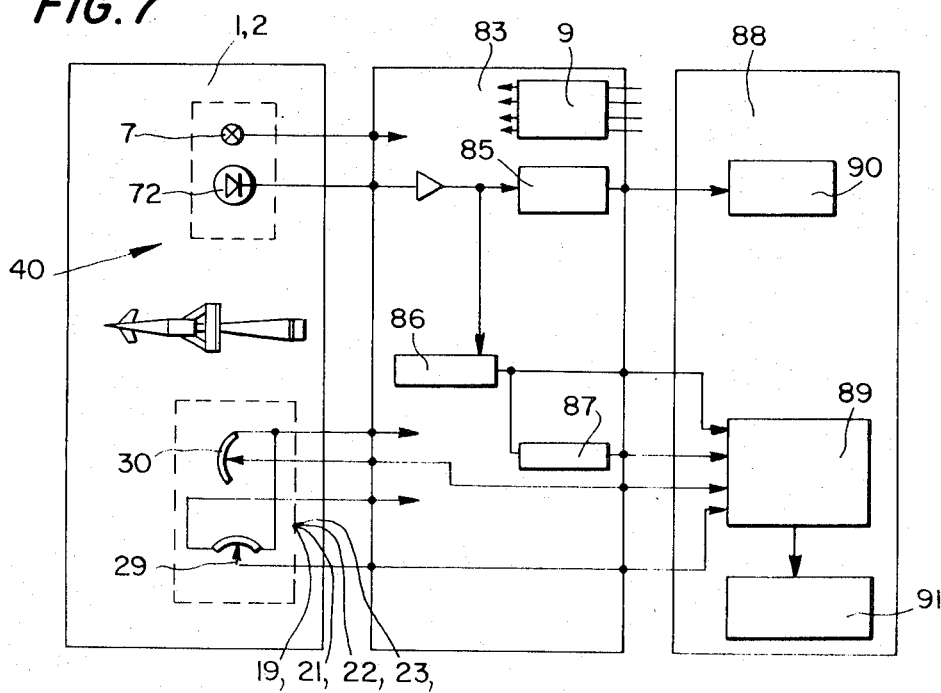

3,618,382
FLIGHT MEASURING INSTRUMENT
Peter Partzsch, Friedrichshafen-Manzell, Germany, assignor to A. G. Dornier, Friedrichshafen (Badensee), Germany
Filed June 19, 1970, Ser. No. 47,829
Int. Cl. G01c 23/00
U.S. Cl. 73—178 R                                  3 Claims

ABSTRACT OF THE DISCLOSURE

This invention relates to a device for simultaneously measuring the angle of incidence, angle of sideslip, flight path and flying speed of an aircraft which comprises a body, a rotatable nose portion mounted on the body and having propeller blades thereon, a tail assembly mounted on the body, a universal joint mounted in the body in the center of gravity of the device and connecting the body with a support, means at the universal joint for determining angles of rotation between the support and the body in two orthogonal directions, means in the body for determining the number of revolutions and speed of rotation of the nose portion, means for measuring acceleration, and means for correlating the measured values for acceleration, angle of incidence and angle of sideslip whereby the acceleration vector is determined.

---

Figure 1:
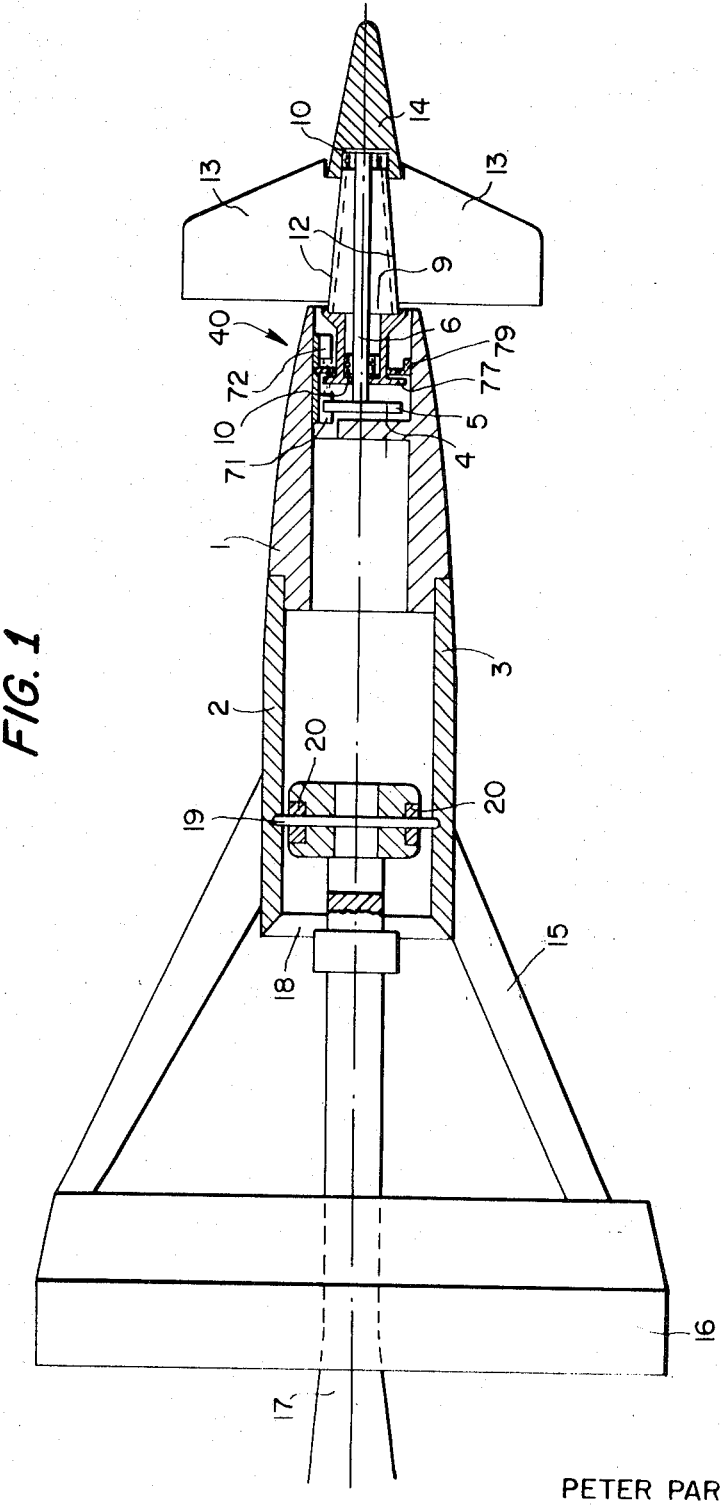

Copending application Ser. No. 871,759, filed May 2, 1969, now abandoned, relates to a flight measuring instrument for simultaneously measuring the angle of incidence, the angle of sideslip, the flight path, and the flying speed of an aircraft.

The copending application takes as its point of departure apparatus of the aforementioned type, in which measurements relative to the flight path and the flight performance are carried out by means of separately mounted individual instruments for determining the angle of incidence and the angle of sideslip, on the one hand, and for determining the flight path and the flying speed on the other hand. As has already been set forth in the copending application, it is necessary, in order that it be possible to obtain accurate measurements, that the aforementioned measuring instruments be mounted in the undisturbed flow, i.e. at a sufficiently great distance from the airplane, and this is achieved, for example, by a supporting mast which points in the direction of flight and is secured to either the nose or to the leading edge of the wing. When all of the instruments which are required for the measurements referred to above are secured to the same supporting mast, difficulties will ensure which reside in that minimum distances between the various instruments must be maintained so that mutual disturbing influences are avoided, due to which latter the results of the measurements are adversely affected. On the other hand, the mounting of each individual instrument at a separate supporting mast results in different disadvantages which reside in an increased cost, additional weight and a disturbing additional resistance.

It has been proposed to mount the instruments in an exchangeable manner at the securing mast and to schedule a separate flight for each measuring program. This separate measuring method cannot be employed, however, for all flight mechanical experiments. A particularly critical case is the problem of measuring the above-mentioned flying data in a relatively small aircraft which is simultaneously an expendable aircraft; in other words, one which carries out only single flight that ends with the destruction of the aircraft. Required in this particular case are relatively small dimensions, a low weight, and a low resistance of the measuring instruments. The measurement of all of the data takes place therein at the same time, and any disturbing influence of the individual measuring instruments must be precluded.

The copending application discloses a measuring instrument which allows for the measurement of the angle of incidence, the angle of sideslip, the flight path, and the flying speed, while nevertheless eliminating the disadvantages of the known instruments having separately mounted individual equipment. More particularly, simultaneous measurement of the above-indicated data to be measured is intended to be rendered possible. According to the copending application, this is achieved by virtue of the provisions of a spindle-shaped body with a rotatable nose portion provided with propeller blades;
a tail unit centrally secured behind the spindle-shaped body;
a universal joint within the center of gravity of the entire installation establishing the connection with a supporting tube rigid with respect to the airplane;
measuring means for determining the angles of rotation between the supporting tube axis and the axis of the instrument in two orthogonal directions at the universal joint;
and a measuring device serving for counting the revolutions and, respectively, the speed of rotation of the nose portion.

The measurement of the angles is advantageously accomplished either in a capacitive manner, or with the aid of potentiometers at the axles of a universal joint, whereas the speed is measured by means of a photoelectric device.

The present invention constitutes a further development of the subject matter of the copending application and, in addition to the measurement of the angle of incidence, the angle of sideslip, the flying speed and the flight path, is concerned with rendering possible the measurement of the acceleration vector without the use of a device separate from the measuring device according to the copending application, in order to thereby obtain information relative to the flight performance with a direct digital indication.

In accordance with the present invention, means for measuring the acceleration are mounted behind the device for measuring the flight path and the flying speed, and coordinated thereto are means for bringing together the values having been measured for the acceleration, as well as of the angle of incidence and the angle of sideslip for purposes of determining the acceleration vector.

Moreover, an additional feature of the present invention resides in that a photoelectrically-acting device for measuring the flying speed and the flight path contains one pulse disc which rotates with the spindle-shaped body, and one stationary pulse disc, both having the same graduation.

The construction proposed by the present invention effectively affords the possibility for obtaining in a simple manner—with the same instrument as that disclosed in the copending application and with only a negligible additional structural expenditure—also information concerning the acceleration vector without the need to mount additional instruments exteriorly of the measuring device according to the copending application. The present invention also eliminates the difficulty of providing for one separate measuring instrument each for the acceleration measurement in the direction of the flight path, i.e. for all of the degrees of freedom, namely for the X and Y and, respectively, Z directions. In an arrangement of that type, there arises the disadvantage that the individual acceleration transmitting means in the center of gravity of the aircraft must be adjusted precisely in the respective axis, which is only very difficultly obtainable in actual practice, since the position of the center of gravity will vary within certain limits during the flight, for example as a result of changes in load, and the like. A further essential disadvantage in connection with the acceleration measurement by means of acceleration transmitting means additionally resides in that during the measurement of the acceleration in the Z-direction, all of the acceleration values are greater than 1 and the superimposed engine vibrations are at least in this very same order. Yet another disadvantage arises in case of the provision of three separate acceleration transmitting means if the requirement exists for bringing together by mathematical calculation the values found for the acceleration measurement so as to obtain the required value in the direction of the flight path. Such a measurement further calls for a very precise angle of incidence and angle of sideslip measurement and moreover for a comparison of the longitudinal inclination of the aircraft with respect to a coordinate system being stationary on the ground. As compared thereto, the construction proposed by the present invention avoids with certainty the disadvantages and drawbacks outlined above.

One embodiment of the present invention is illustrated in the accompanying drawings, wherein FIG. 1 is a longitudinal cross-sectional view through the measuring device according to the present invention, FIG. 2 schematically illustrates the design of the universal joint with a capacitive angle-measuring instrument, in a longitudinal cross-sectional view thereof, FIG. 3 is a longitudinal cross-sectional view through the universal joint according to FIG. 2, taken along line III—III of FIG. 2, FIG. 4 is a longitudinal cross-sectional view through a universal joint with potentiometer taps, FIG. 5 is a cross-sectional view through the universal joint of FIG. 4, taken along line V—V of FIG. 4, FIG. 6 illustrates, in a perspective view, a portion of FIG. 1 at an enlarged scale, and FIG. 7 illustrates on the basis of a wiring diagram the construction of the electrically-acting part of the flight measuring instrument.

In FIG. 1, the shell of the spindle-shaped body is composed of two halves 1 and 2 which are joined together at the connecting point 3 for example by means of plugs or a bayonet lock. Rigidly connected with the half 1 is a supporting bulkhead 4 to which the entire nose portion is secured. This nose portion is composed of one stationary and one rotatable part, both of which form together an integral unit. With the aid of a clamping disc 5 the entire nose portion is secured to the bulkhead 4. The axle 6 is rigidly connected to the clamping disc 5, and the hub 9 is rotatably mounted thereon with the aid of the two radial ball bearings 10. Reference numeral 12 identifies slide grooves in the hub 9 which serve for sliding thereon the exchangeable propeller blades 13. The forward threadable portion 14 serves for securing the hub 9 upon the axle 6 and the propeller blades 13 in the slide grooves 12. A counting mechanism 40, which operates photoelectrically, is in operative engagement with the rotatable nose portion and the spindle-shaped body 1, 2, and will be described in further detail hereinbelow.

The rear shell 2 of the spindle-shaped body is rigidly connected with the annular tail unit 16 with the aid of the supporting struts 15. The instrument is supported by means of a supporting tube 17 whose longitudinal axis is adjusted in the direction of a mean air flow in the flying condition. The supporting tube 17 is introduced through the opening 18 into the interior of the spindle-shaped body and is connected with the shell 2 by means of a universal joint which is positioned in the center of gravity of the instrument. In the cross-sectional view shown, one axle 19 of the universal joint with the ball bearings 20 is indicated in a manner such that the supporting tube 17 is in an articulated connection with the shell 2. The measuring device for the angle determination will be described in further detail in connection with the following figures.

FIGS. 2 and 3 are longitudinal cross-sectional views through a universal joint including angle-measuring instruments on a capacitive basis. Reference numeral 21 identifies a forked portion which may be threaded upon the supporting tube 17 (see FIG. 1), and reference numeral 22 identifies a further forked portion which is secured to the housing shell 2. Rigidly connected to the forked portion 22 is the axle 19, and rigidly connected to the forked portion 21 are the axles 23. Reference numerals 20 and 24 identify the respectively coordinated radial ball bearings. Moreover, reference numerals 25, 26 and 27, 28 are used to designate the plates of two capacitor systems which are connected with a measuring bridge in known manner. When, in FIG. 2, the supporting tube portion 21 with the plate 26 moves about the axle 23 (FIG. 3) either upwardly or downwardly, the capacity of the plate system 25, 26 changes in a first approximation proportionally to the deflection about the zero position. The same holds true analogously for the plate system 27, 28 for a rotation of the portion 21 about the axle 19. An illustration of the electrical lines has been dispensed with herein in the interest of a greater clarity, particularly also in view of the fact that these are switching arrangements which are known. When, for example, the axle 19 of the universal joint is adjusted parallel to the vertical axis of the aircraft, and the axle 23 parallel to the lateral axis, the angle of incidence will be measured with the plate system 25, 26, while the angle of sideslip will be measured with the plate system 27, 28.

FIGS. 4 and 5 schematically illustrate a construction of the universal joint with potentiometer taps for determining the angles. The potentiometers 29 and 30 are so coupled with the axles 19 and 23 that during rotations about these axles, resistance changes will arise proportionally to the angular deflection. The potentiometers and taps thereof also may be mounted upon other points suitable therefor. Since the pivot angle of the instrument is limited, potentiometer segments, for example, will suffice at the point of the capacitor plates 25, 26 and 27, 28, shown in FIGS. 2 and 3. The taps are effected in this case from the points or places of the capacitor plates 26, 28.

As has already been mentioned, and as is shown particularly in FIGS. 1 and 6, the counting mechanism 40 operates photoelectrically. The counting mechanism 40 is composed in this case of a light source 71, a photoelectric cell 72 and an optical system 75 connected in series with the light source 71. Interposed between the light source 71 and the optical system 75 connected in series with respect thereto, is a counting disc 77 for beaming the radiation, which has a very fine line graduation 78. The counting disc 77 is connected in a manner such as to be rigid against rotation with respect to the nose portion of the flight measuring device which rotates as a result of air flow. Further provided is another counting disc 79 with the same graduation 80 as that of the disc 77, and the disc 79 is rigidly connected with the spindle-shaped body 1, 2. The axes of the two discs 77 and 79 are coaxial with respect to each other and are so positioned with regard to the direction of radiation of the light source 71 that light rays are directed toward the graduations 78 and 80, respectively, of the discs 77 and 79, respectively. The photodiode 72 is likewise rigidly mounted at the spindle-shaped body 1, 2, and specifically in such a manner that the light rays of the light source 71 passing through the line graduations 78 and 80, respectively, of the discs 77 and/or 79 impinge upon the photodiode 72 in the form of light impulses in accordance with the graduation of the discs, and current impulses emanating from the photodiode 72 are guided as a result to a counting mechanism.

FIG. 7 illustrates the construction of the electronic system and of the indicating as well as registering devices, and also that serving for the indication of the flying speed and flight path as well as the angles of incidence and sideslip. As in FIG. 1, the flight measuring instrument has been shown here again as being composed of the spindle-shaped body, the universal joint and the rotatable nose portion with the propeller blades. As has already been set forth, the flight measuring instrument contains the photoelectrically-operating counting mechanism 40 for determining the flying speed and the flight path, as well as the potentiometer members 29 and 30 for determining the angles of incidence and sideslip. The outputs of the counting mechanism 40 and of the potentiometer members 29 and/or 30 are connected to an electronic system 83. The electronic system 83 contains a counting device 85, a digital-analog converter 86, as well as a differentiating unit 87. The photodiode 72 is connected to the counter 85 via corresponding lines, and also provided is a line which branches off from the feed line and extends to the digital-analog converter 86. A connecting line leads from the counter 85 to an indicating instrument 90 in an indicating system, which has been identified herein with reference numeral 88. The indicating system 88 further contains a computer 89 to which are connected not only the digital-analog converter 86 and the differentiating unit 87 of the counting device 40, but also the potentiometer members 29 and 30, respectively. The computer 89 further contains an indicating instrument 91 for the indication of the aceleration vector and for the indication of the flow vector.

The operation of the device according to the present invention will now be further described.

In the operative condition, the onflowing air sets the propeller blades 13 in rotation. The number of revolutions is an indication of the distance having been covered along the flight path, and the speed of rotation is an indication of the instantaneous flying speed. The number of revolutions may be counted digitally, for example with the aid of the electrical impulses produced by means of the photoelectric measuring device. The number of revolutions within a correspondingly brief unit of time provides the speed of rotation.

As compared to the velocity determinations which are based upon pressure measurements, the method which is based upon the measurement of the rotation of the propeller has the advantage of being independent of altitude variations; as long as the aerodynamic forces do not become so small as to become equal to the order of magnitude of the bearing frictional forces.

It is of decisive significance for the accurary of the distance and velocity measurements that the pivot bearing friction of the rotatable nose portion be small, and that the flow against the propeller blades take place precisely in the direction of the longitudinal axis of the measuring device. The exterior configuration of the instrument is important for the independence from tenacity and compressibility influences. These requirements have been taken into account in an advantageous manner in the present invention. The rotational speed is measured in a reaction-free manner with the aid of the photoelectric device so that the rotary resistance of the nose portion may be maintained very small. The longitudinal axis of the instrument is set precisely in the direction of air flow by means of the annular tail unit mounted behind the universal joint. The annular tail unit supplies great directional forces and good damping properties while having only a limited span. The spindle-shaped configuration enhances the disturbance-free flow against the propeller blades even within the compressible flying speed range. The disconnecting or separating point 3 not only renders possible a ready access to the universal joint bearing and the securing bulkhead 4, but also allows for exchanging the entire front part inclusive of the shell 1, if it is intended that the measurement be taken, for example, in the high ultrasonic range where a different contour is required.

As has already been indicated hereinabove, the number of revolutions of the nose portion being provided with propeller blades 13 constitutes an indication of the distance having been covered along the flight path, and the speed of rotation is an indication of the momentary flying speed. The measurement and, respectively, the indication proceeds in a manner such that the light rays being produced by the light source 71 impinge—via the optical system 75 being disposed thereahead—upon the counting disc 77, rotating with the nose portion and comprising the line graduations 78. By means of the line graduations 78, light impulses are transmitted to the photoelectric cell 72 and converted into electrical impulses. By means of the stationary counting disc 79 and, respectively, the line graduations 80 thereof it is possible to achieve a finer impulse transmittal by temporarily covering the line graduations 78 of the rotating counting disc 77 with the line graduations 80 of the stationary counting disc 79. The current impulses of the photodiode 72 are supplied to the counter 85 in the electronic system 83 and from there are fed to an indicating instrument 90 in the indicating system 88. Furthermore, the voltage tapped by the potentiometer members 29 and/or 30 is transmitted to the computer 89 in the indicating system 88, where the values for the onflow vector and the acceleration vector are being formed and caused to be directly indicated on the indicating instrument 91.

Accordingly, the following advantages are afforded with the flight measuring instrument constructed as proposed by the present invention:

It is possible to achieve an accurate measurement of the angle of incidence and the angle of sideslip as well as of the flight path and the flying speed without mutual influencing thereof and with limited spatial dimensions and a low aerodynamic resistance within a large speed range, and assuring a large degree of independence of the flight measuring instrument with regard to altitude variations, Mach number and Reynolds number, whereby a low-resistance mounting of the measuring instrument at the supporting tube of the airplane is rendered possible. Further rendered possible with the same instrument, without additional expenditure regarding specific structural elements, is a direct indication of the acceleration vector and simultaneously therewith also of the onflow vector. Accordingly, only a single flight measuring instrument is needed for the measurements mentioned above, and it is hence possible to obviate the provision of further measuring instruments at the wing of the airplane, or at a further mast tip, with the necessarily resulting increased expenditure, additional weight and disturbing additional resistances, and to prevent any falsification of the measuring results.

It will be obvious to those skilled in the art that many modifications may be made within the scope of the present invention without departing from the spirit thereof, and the invention includes all such modifications.

What is claimed is:

1. A device for simultaneously measuring the angle of incidence, angle of sideslip, flight path and flying speed of an aircraft which comprises a body, a rotatable nose portion mounted on the body and having propeller blades thereon, a tail assembly mounted on the body, a universal joint mounted in the body in the center of gravity of the device and connecting the body with a support, means at the universal joint for determining angles of rotation between the support and the body in two orthogonal directions, means in the body for determining the number of revolutions and speed of rotation of the nose portion, means for measuring acceleration, and means for correlating the measured values for acceleration, angle of incidence and angle of sideslip whereby the acceleration vector is determined.

2. A device according to claim 1 in which the means in the body for determining the number of revolutions and speed of rotation of the nose portion comprises a photoelectrically-acting device including one rotatable impulse disc and one stationary impulse disc having the same graduation.

3. A device according to claim 2 in which the photoelectrically-acting device is connected to a differentiating unit whose output is connected to a computing device together with the output of a pair of potentiometers mounted at the universal joint, whereby the acceleration vector is determined.

References Cited

UNITED STATES PATENTS 2,662,402   12/1953   Ince, Jr., et al. _____ 73—180

DONALD O. WOODIEL, Primary Examiner

U.S. Cl. X.R.

73—180, 187